Patented Aug. 15, 1950

2,518,692

UNITED STATES PATENT OFFICE 2,518,692

METHOD OF PREPARING AROMATIC ESTERS OF PHOSPHORIC ACID

David C. Hull and Jerry R. Snodgrass, Kingsport, Tenn., assignors to Eastman Kodak Company, Rochester, N. Y., a corporation of New Jersey No Drawing. Application July 11, 1947, Serial No. 760,483

5 Claims. (Cl. 260—461)

This application relates to the preparation of aromatic esters of phosphoric acid by the reaction of $P_2O_5$ and the corresponding metaphosphate esters with aromatic ethers.

Of late years the neutral esters of phosphoric acid have been found to be useful for many purposes, such as plasticizers, lubricants in spinning, starting materials for insecticides, and the like. Some of the more commonly known members of this class are triphenyl phosphate, tricresyl phosphate, triethyl phosphate, and tributyl phosphate. Up until recently the commonly employed method for preparing these esters has been by the action of phosphorous oxychloride and an alcohol or phenol resulting in the formation of hydrochloric acid. There have been many patents issued relating to modifications of this reaction in order to prevent side reactions caused by the liberated hydrochloric acid. As a consequence, the yields have been low and the method has been expensive.

In our prior Patent 2,407,279 we have described and claimed a method of preparing triethyl esters of phosphoric acid in which a reaction has been carried out between diethyl ether and $P_2O_5$ in an autoclave. By that method good yields of triethyl phosphate were obtained. We have also found that the aromatic esters of phosphoric acid may be prepared by reacting an aromatic ether with $P_2O_5$ or a metaphosphate at an elevated temperature below the boiling point of the ether.

One object of our invention is to provide a process for preparing neutral aromatic esters of phosphoric acid without the disadvantages connected with prior processes which have been employed for their manufacture. Another object of our invention is to provide a method of preparing triaryl phosphates. A further object of our invention is to provide a process for preparing triaralkyl phosphates. A still further object of our invention is to provide a process of preparing aromatic esters of phosphoric acid by the use of ethers containing the aromatic groups desired in the ester products. A still further object of our invention is to provide a process for preparing aromatic esters of phosphoric acid in which $P_2O_5$ may be employed as the starting material. Other objects of our invention will appear herein.

We have found that by using an elevated temperature $P_2O_5$ or a meta phosphate and an aromatic ether will react to form a neutral ester of phosphoric acid and thereby good yields of phosphoric acid esters may be obtained, less expensive starting materials may be employed, and the phosphates may be produced in a more pure state without the necessity of expensive purifying procedures. The products obtained in accordance with our invention are triaryl phosphates or triaralkyl phosphates. With the process in accordance with our invention the product obtained is sufficiently pure after vacuum distillation to be suitable for most purposes in which the product is employed.

In accordance with our invention $P_2O_5$ (or an organic metaphosphate) and an aromatic ether are mixed together in a well agitated reaction vessel and heated to a temperature of 50–180° C. It is desirable in carrying out the reaction that at least the less vigorous portion of the reaction which constitutes the latter portion thereof be carried out at a temperature of 120–180° C. to obtain the product in good yield.

The reaction in accordance with our invention may be carried out whether in the presence or the absence of an esterification catalyst. We have found, however, that when a catalyst is employed, the yields are ordinarily greater and, therefore, the presence of a catalyst in the reaction mass is often desirable.

The aromatic ethers which may be employed as the starting material in our invention are either the aralkyl ethers, such as dibenzyl ether, $\beta\text{-}\beta'$ diphenyl diethyl ether, $\beta\text{-}\beta'$ diphenyl diisopropyl ether, and dichloro dibenzyl ether; or the straight aryl ethers, such, for example, as diphenyl ether, dicresyl ether, or the like. Better results are ordinarily obtained when the ether is anhydrous although small amounts of moisture have been tolerated in some cases. It is also preferred that when $P_2O_5$ is employed, it has not been exposed to the moisture of the air to any appreciable extent.

The reaction mass initially may be at any temperature within the range of 50–90° C., and this temperature is suitable for the first or more vigorous portion of the reaction. After the initial reaction has subsided, the reaction is then completed by heating the mixture at 120–180° C. for several hours. For convenience the reaction may be carried out from the beginning at temperatures within the latter range. After the reaction is completed, the triaryl or triaralkyl phosphate which has been formed is desirably removed from the mass by distillation or sublimation using a reduced pressure. Pressures within the range of 1 to 10 mm. of mercury are ordinarily suitable for this purpose although pressures either lower or higher than this range can be employed with good effect.

The highest yields are obtained in our process where the residue from a previous batch is mixed in with the reaction ingredients and again reacted. This procedure aids in recovering additional phosphoric acid ester from a previous residue. If desired, a previous residue may be employed as the source of the phosphorus without adding any $P_2O_5$. Instead of, or in addition to $P_2O_5$, organic meta phosphates may be employed for the starting material. If an ethyl meta phosphate is employed as the starting material, a mixed phosphate ester will be obtained, whereas if a meta phosphate is employed, the resulting product may or may not have a mixture of aromatic groups in the final product depending upon whether or not the ether used has the same groups as the meta phosphate used as the starting material. It is desirable that the ether be employed in excess of the theoretical amount. For instance, it is desirable that the amount of ether employed be in a molar amount at least three times the molar amount of the $P_2O_5$. However, the proportion of ether employed may be five times or even eight or more times the proportion of $P_2O_5$ or phosphorus-supplying material which is employed in the reaction.

Esterifications have been carried out in accordance with our invention in a satisfactory manner, both with and without esterification catalysts. Some of the esterification catalysts which are suitable for use in esterifications in accordance with our invention are iodine, sulfuric acid, phosphoric acid, potassium ferrocyanide, ferric chloride, and zinc chloride.

The following examples illustrate our invention:

*Example 1.*—100 parts of $P_2O_5$ were slowly added to 309 parts of dibenzyl ether at 80–90° C. over a period of thirty minutes. The temperature was then gradually raised to 135–140° C. over a period of 2½ hours thereby completing the reaction. The mass was subjected to vacuum distillation at 1–2 mm. of mercury using a base heater temperature of 260–340° C. 24 parts of tribenzyl phosphate having a melting point of 61–3° C. were obtained.

*Example 2.*—396 parts of dibenzyl ether were mixed with 340 parts of the residue resulting from Example 1. The mixture was stirred and heated at 140–150° C. for twelve hours. The mass was then subjected to vacuum distillation, 1–2 mm. of mercury pressure, and 174 parts of tribenzyl phosphate were obtained.

*Example 3.*—400 parts of anhydrous diphenyl ether and 50 parts of $P_2O_5$ were added to a well-agitated stainless steel autoclave. The temperature of the mass was gradually raised to 140° C. and was maintained between 130 and 150° C. for ten hours. The mass was then subjected to vacuum distillation (5 mm. of mercury pressure) and a yield of 28.8% of triphenyl phosphate based on the $P_2O_5$ was obtained.

*Example 4.*—255 parts of diphenyl ether were mixed with 71 parts of $P_2O_5$ and 0.5 part of iodine in a reaction vessel. The mixture was stirred and heated at reflux for twenty-four hours. Vacuum distillation gave 43 parts of triphenyl phosphate.

*Example 5.*—200 parts of diphenyl ether were mixed with 168 parts of diphenyl meta phosphate, and the mixture was stirred and heated at 160–170° C. for sixteen hours. Vacuum distillation gave 71 parts of triphenyl phosphate.

The phosphates obtained in accordance with our invention may be employed for plasticizing cellulose derivatives or may be added to various compositions to decrease inflammability. In the preceding examples other aromatic ethers than those listed may be employed, especially ethers of the aralkyl type.

We claim:

1. A method of making aromatic esters of phosphoric acid which comprises heating one molar proportion of $P_2O_5$ with at least three molar proportions of a symmetrical aromatic ether having the formula ROR wherein R represents an aromatic hydrocarbon radical at a temperature within the range of 50–180°, the total heating being effected for a sufficient time to form a substantial amount of neutral aromatic orthophosphate ester $(RO)_3PO$, wherein R has the above-defined meaning.

2. A method of making aromatic esters of phosphoric acid which comprises heating one molar proportion of $P_2O_5$ with at least three molar proportions of a symmetrical aromatic ether having the formula ROR, wherein R represents an aromatic hydrocarbon radical, first at a temperature within the range 50 to 120° C., and then at a temperature within the range 120 to 180° C., the total heating being effected for a sufficient time to form a substantial amount of neutral aromatic orthophosphate ester $(RO)_3PO$, wherein R has the above-defined meaning.

3. A method of making tribenzyl phosphate which comprises heating one molar proportion of $P_2O_5$ with at least three molar proportions of dibenzyl ether, first at a temperature within the range of 50–120° C. and then at a temperature within the range of 120–180° C., the total heating being effected for a sufficient time to form a substantial amount of tribenzyl orthophosphate.

4. A method of making aromatic esters of phosphoric acid which comprises heating one molar proportion of $P_2O_5$ with at least three molar proportions of a symmetrical aromatic ether having the formula ROR, wherein R represents an aromatic hydrocarbon radical, first at a temperature within the range 50 to 120° C., and then at a temperature within the range 120 to 180° C., the total heating being effected for a sufficient time to form a substantial amount of neutral aromatic orthophosphate ester $(RO)_3PO$, wherein R has the above-defined meaning, and then subjecting the reaction mass to vacuum distillation to remove the neutral aromatic orthophosphate ester from the mass.

5. A method of making tribenzyl phosphate which comprises heating one molar proportion of $P_2O_5$ with at least three molar proportions of dibenzyl ether, first at a temperature within the range of 50–120° C. and then at a temperature of 120–180° C., the total heating being effected for a sufficient time to form a substantial amount of tribenzyl phosphate, and then subjecting the reaction mass to vacuum distillation to remove the tribenzyl phosphate from the mass.

DAVID C. HULL.
JERRY R. SNODGRASS.

REFERENCES CITED

The following references are of record in the file of this patent:

UNITED STATES PATENTS

| Number | Name | Date |
| --- | --- | --- |
| 2,407,279 | Hull et al. | Sept. 10, 1946 |

OTHER REFERENCES

Wagner-Jauregg et al., "Ber. deutsch. chem. Ges., vol. 70B (1937), pages 1 to 8.